E. E. CARLSON.
FRUIT JAR.
APPLICATION FILED MAR. 11, 1912.
1,036,960.
Patented Aug. 27, 1912.
Fig. 1.
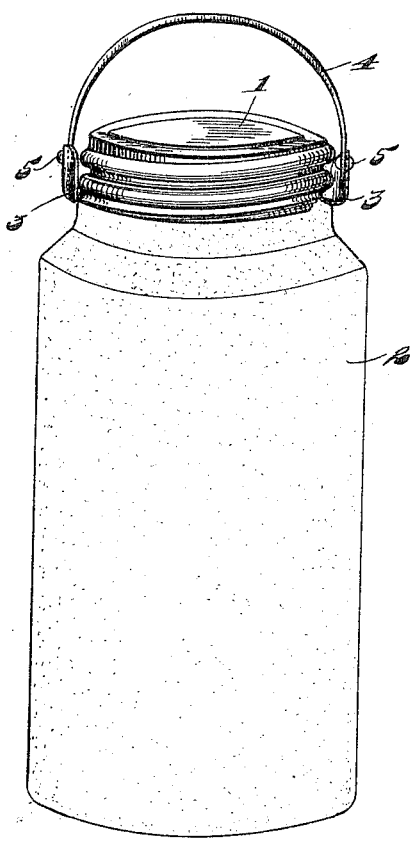
Fig. 2.
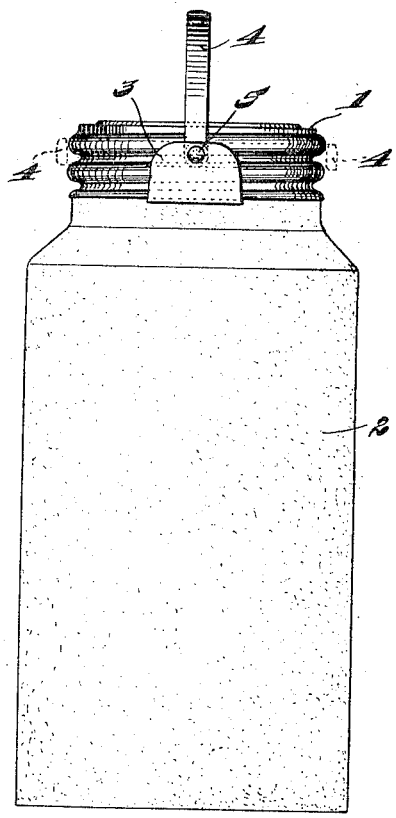
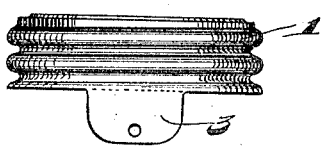
Fig. 3.
Witnesses:
C. E. Wessels.
A. A. Olson.
Inventor:
Edward E. Carlson,
By Joshua R. H. Potts
his Attorney.

UNITED STATES PATENT OFFICE.

EDWARD EMMANUEL CARLSON, OF GENEVA, ILLINOIS.

FRUIT-JAR.

1,036,960.  Specification of Letters Patent.  Patented Aug. 27, 1912.

Application filed March 11, 1912. Serial No. 683,053.

*To all whom it may concern:*

Be it known that I, EDWARD E. CARLSON, a citizen of the United States, and a resident of the city of Geneva, county of Kane, and State of Illinois, have invented certain new and useful Improvements in Fruit-Jars, of which the following is a specification.

My invention relates to fruit jars and more specifically to a cover therefor, and has for its object the production of a fruit jar cover which will be of improved construction and efficient in operation.

Other objects will appear hereinafter.

With these objects in view, my invention consists in the combinations and arrangements of parts hereinafter described and claimed.

My invention will be more readily understood by reference to the accompanying drawing forming a part of this specification, and in which—

Figure 1 is a perspective view of a fruit jar to which is applied a cover embodying my invention, a portion of the latter being shown in section to better illustrate the construction, Fig. 2 is a side elevation of the construction shown in Fig. 1, and Fig. 3 is a side view of the cover in the course of formation.

The preferred form of construction, as illustrated in the drawing, comprises a cover or cap 1 which is screw-threaded for engagement with the usual screw threads which are provided at the upper end or neck of an ordinary fruit jar 2, the latter being of any conventional form.

Provided at the lower edge of the cover 1 are ears 3 which are formed integrally with and on diametrically opposite sides thereof. The ears 3, in the course of construction of the cover, are first formed depending from the latter, as shown in Fig. 3, the same being subsequently bent outwardly and upwardly, as shown in Figs. 1 and 2, for pivotal engagement by the respective extremities of the semi-circular bail or handle 4, said extremities of said bail being connected with said ears by headed studs or attaching devices 5 which engage perforations provided in said bail extremities and said ears. The bail is of such diameter as to be adapted to be swung downwardly to horizontal position, as shown in dotted lines in Fig. 2, in which position the same will be disposed coplanar with the cap adjacent the periphery thereof, and so that said bail, when in this position, will not project from the cap and interfere with storage or shipment thereof.

The provision of a bail 4 connected with the cover, as shown and described, affords a convenient and effective grip for tightening or loosening the cover and also as a handle for readily carrying the fruit jar from place to place. The formation of the ears 3 integral with the cover results in a durable as well as economical construction. The cover, because of its simplicity, may be manufactured at a low cost and will be found of high efficiency in serving the purpose for which the same is designed.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

Having described my invention, what I claim as new and desire to secure by Letters Patent, is:

The combination with a fruit jar, of a cap threaded thereon; ears formed integrally on the lower edge of said cap at points diametrically opposite each other and bent outwardly and upwardly; and a combined wrench and bail pivotally connected with said ears, substantially as described.

In testimony whereof I have signed my name to this specification in the presence of two subscribing witnesses.

EDWARD EMMANUEL CARLSON.

Witnesses:
A. W. COLLINS,
JOHN T. PITMAN.